United States Patent

[11] 3,588,484

[72] Inventors Tetsunori Nishimoto
Kokubunji-shi;
Kisaburo Nakazawa; Koichiro Ishihara,
Kodaira-shi; Hisashi Horikoshi,
Tachikawa-shi, Japan

[21] Appl. No. 760,510
[22] Filed Sept. 18, 1968
[45] Patented June 28, 1971
[73] Assignee Hitachi, Ltd
Tokyo, Japan
[32] Priority Sept. 18, 1967
[33] Japan
[31] 42/59444

[54] ERROR DETECTING SYSTEM OF ADDER
7 Claims, 13 Drawing Figs.

[52] U.S. Cl. ........ 235/153
[51] Int. Cl. ........ G06f 11/00
[50] Field of Search ........ 235/153

[56] References Cited
UNITED STATES PATENTS 2,988,191 8/1961 Marshall ........ 235/153
3,051,387 8/1962 Pomerene et al. ........ 235/153
3,078,039 2/1963 Anderson ........ 235/153

*Primary Examiner*—Malcolm A. Morrison
*Assistant Examiner*—R. Stephen Dildine, Jr.
*Attorney*—Craig, Antonelli, Stewart & Hill

ABSTRACT: A carry of the lower figure of two adjacent numerical figures of an adder is fed to a second carry circuit with an augend and an addend of the upper figure and a second carry is produced thereby. The second carry is compared to a first carry of the upper figure derived from a carry look ahead circuit with the result that an error check signal is generated when first and second carries do not agree with each other.

INVENTORS
TETSUNORI NISHIMOTO
KISABURO NAKAZAWA
KOKHIRO ISHIHARA
HISASHI HORIKOSHI
BY
Craig & Antonelli
ATTORNEYS INVENTORS
TETSUNORI NISHIMOTO
KISABURO NAKAZAWA
KOICHIRO ISHIHARA
HISASHI HORIKOSHI

BY

Craig & Antonelli
ATTORNEYS

ERROR DETECTING SYSTEM OF ADDER

BACKGROUND OF THE INVENTION

This invention relates to an error detecting system in which the operation error of a digital adder is detected exactly as soon as the operation of the adder is finished.

Recent improvements in the reliability and processing ability of digital information processing apparatus including digital computers have enabled these apparatus not only to serve as calculating machines for offline use but to find extensive applications as well in the information processing field where various momentarily incoming information is processed online. For example, process control and central train running control by computers and multiple processing by time sharing on computers are now generally in practice. In such online processing any error of the information processing apparatus in the course of processing can involve a serious consequence, and it is important to detect any such error of the apparatus and take a suitable countermeasure.

Techniques generally known to the art for detecting an operation error by an adder which constitutes an essential circuit of the arithmetic unit of a computer include:

1. Reverse operation of the outcome of the operation to make certain that the initial conditions can thereby be revived.
2. Provision of two sets of adders to detect as an error any disagreement between the results of operations by these adders.
3. Parity checking.

The method (1) above is advantageous because it requires no special hardware for the detection purpose but has drawbacks in that it calls for the provision of software for the reverse operation and that the operation time for the addition operation has to be more than doubled.

The method (2) permits an accurate error check unless errors occur simultaneously in the same bits of the two sets of adders. It becomes very costly, however, to provide identical sets of adders comprised of so many circuit components as the high speed adders using the carry look ahead circuits to be described later.

The method (3) is disadvantageous because, while it is useful for exact error check where there occurs an odd number of errors in the adder, the method is not applicable to the cases in which an even number of errors take place.

SUMMARY OF THE INVENTION

A principal object of this invention is to provide an error detecting system which is effective in a high speed adder.

Another object of this invention is to provide a relatively cheap error detecting system for an adder in which the operation error can be exactly detected.

Still another object of this invention is to make it possible to detect the operation error immediately after completion of the addition operation in the adder.

The error detecting system according to the present invention comprises first carry circuits composed of carry look ahead circuits for the adder and second carry circuits, each of which produces a second carry from the carry of each figure of the adder and from the augend and addend applied to the said adder, so that the disagreement, if any, between the carry of the adder and the second carry produced by the secondary carry circuits can be detected as an error.

Accordingly, even if the adder is designed for high speed operation and the construction of its principle carry circuits is complicated, the secondary carry circuits simply produce the second carry from the carry of each figure of said adder, and therefore the carry circuits of a simplest construction can be employed as the second carry circuits. Moreover, the time required to detect an error is limited because it is only equal to the time for passing the single stage of carry circuits plus the negligible period of time for checking whether the two carries are in agreement with each other.

Various further and more specific objects, features and advantages of the invention will appear from the description given below, when taken in connection with accompanying drawings which illustrate by way of example certain preferred embodiments of this invention.

SPECIFIC DESCRIPTION OF THE INVENTION

Before proceeding with an explanation of the embodiments of the invention, description will be made of an exemplary construction of an adder.

A digital adder basically consists of carry circuits and sum circuits. For example, the carry $C_i$ and sum $S_i$ on the *i*-th figure of a binary full adder can be represented by a logical formula (1) below from the augend $A_i$ and addend $B_i$ of the *i*-th figure and from the carry $C_{i-1}$ on the *i*-th figure:

$$C_i = C_{i-1}\cdot A_i + C_{i-1}\cdot B_i + A_i\cdot B_i$$
$$S_i = C_{i-1}\cdot \overline{A_i}\cdot B_i + C_{i-1}\cdot \overline{A_i}\cdot \overline{B_i} + \overline{C_{i-1}}\cdot A_i\cdot \overline{B_i} + \overline{C_{i-1}}\cdot \overline{A_i}\cdot B_i \qquad (1)$$

where symbol (·) indicates a logical product, symbol (+) a logical sum, and symbols $\overline{A_i}$, $\overline{B_i}$ and so forth, inverted signals, respectively, of symbols $A_i$, $B_i$ and so forth. From the logical formula (1) it is possible to constitute circuits as shown in FIGS. 1*a* and 1*b*.

Figure 1A:
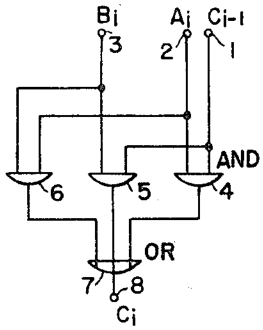
FIG. 1a PRIOR ART
FIGS. 1*a* and 1*b* are schematic circuit diagrams each showing the circuit arrangement for one figure of an adder of known type.

In FIG. 1*a* there is shown the construction of a unit carry circuit, in which signals $C_{i-1}$, $A_i$ and $B_i$ are applied, respectively, to input terminals 1, 2 and 3. By AND circuits 4, 5 and 6 logical products of different pairs of the three signals are obtained. These outputs are taken out of the logical sum through an OR circuit 7, so that a carry $C_i$ to the next figure emerges through an output terminal 8 when at least two of the three signals $C_{i-1}$, $A_i$ and $B_i$ are "1."

Figure 1B:
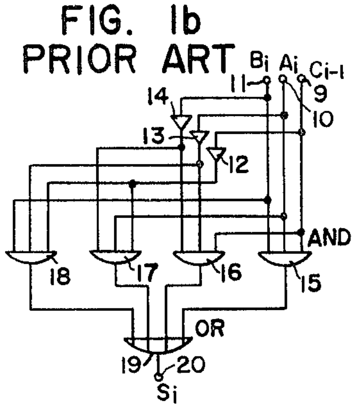
FIG. 1b PRIOR ART

Shown in FIG. 1*b* is a unit sum circuit, in which signals $C_{i-1}$, $A_i$ and $B_i$ applied, respectively, to input terminals 9, 10 and 11, and signals $\overline{A_i}$, $\overline{B_i}$ and $\overline{C_{i-1}}$ obtained by inverting the signals $C_{i-1}$, $A_i$ and $B_i$ through inverters 12, 13 and 14, are passed through AND circuits 15 to 18 and OR circuit 19 so that a sum $S_i$ of the *i*-th figure can show up at an output terminal 20. The circuit is constructed in such way that when an odd number of the signals $C_{i-1}$, $A_i$ and $B_i$ is "1" the sum $S_i$ on the *i*-th figure can be "1."

Figure 2:
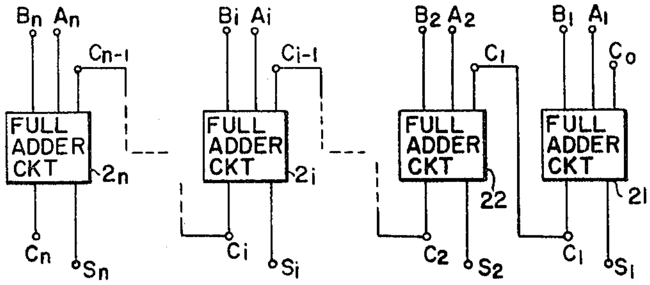
FIG. 2 PRIOR ART
FIG. 2 is a schematic diagram of an adder comprised of a plurality of the circuits, as shown in FIGS. 1*a* AND 1*b* above, in cascade connection.

FIG. 2 is a schematic diagram of a full adder of known type comprised of unit adder circuits 21 to 2*n* in cascade connection, each unit adder circuit consisting of a unit carry circuit and a unit sum circuit as shown in FIGS. 1*a* and 1*b*. While this adder can be formed of simplified circuits, it involves propagation of the carry from the first figure in succession to the *n*-th figure in an extreme case, thus necessitating a considerable period of time before the completion of operation.

To avoid any drop of operating speed due to such carry propagation, various types of adders have so far been contrived. One example is the adder using carry look ahead circuits as disclosed in M. Lehman and N. Burla: Trans I.R.E., EC-10, 4, pp. 691—698. The paper describes a so-called carry look ahead circuit, which permits an adder to be divided into groups of several figures each, with each group operatingly generating a carry for the next higher group therefrom from the input augend and addend applied thereto and a carry supplied from the next lower group therefrom.

Figure 3:
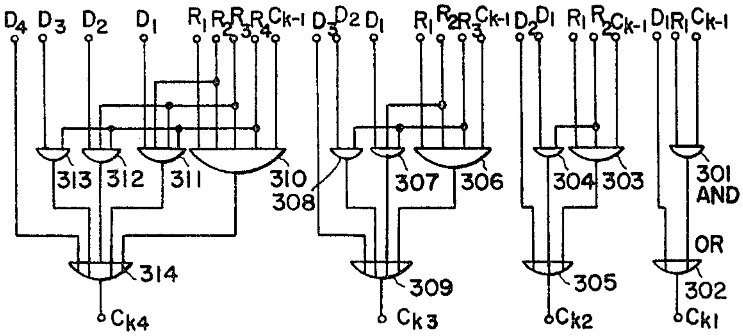
FIG. 3 PRIOR ART
FIG. 3 is a schematic circuit diagram showing an example of a carry look ahead circuit of a high speed adder also known in the art.

FIG. 3 is a schematic circuit diagram illustrating an example of such a carry look ahead circuit. The diagram shows the K-th group in a plurality of groups of four figures each, for example, formed of carry circuits. Input signals $R_1$, $R_2$, $R_3$ and $R_4$ represent the logical sums, respectively, of each of the augends $A_{k1}$, $A_{k2}$, $A_{k3}$ and $A_{k4}$ and each of the addends $B_{k1}$,$B_{k2}$, $B_{k3}$ and $B_{k4}$ of the figures corresponding to the said input signals, i.e., $R_1=A_{k1}+B_{k1}$, $R_2=A_{k2}+B_{k2}$, $R_3=A_{k3}+B_{k3}$ and $R_4=A_{k4}+B_{k4}$. Similarly, input signals $D_1$, $D_2$, $D_3$ and $D_4$ signify the logical products of each of the above augends and each of the above addends, i.e., $D_1=A_{k1}\cdot B_{k1}$, $D_2=A_{k2}\cdot B_{k2}$, $D_3=A_{k3}\cdot B_{k3}$ and $D_4=A_{k4}\cdot B_{k4}$. Accordingly $R_1$— $R_4$ are signals obtained by passing, for example, the augends $A_{k1}$—$A_{k4}$ and the addends $B_{k1}$—$B_{k4}$ through one stage of an OR circuit each, and $D_1$—$D_4$ are signals obtained by passing, for example, the augends $A_{k1}$-—$A_{k4}$ and the addends $B_{k1}$—$B_{k4}$ through one stage of an AND circuit each.

From these signals and from the carry $C_{k11}$ from the $k$—1-th group which is the group preceding the $k$-th group shown in FIG. 3, the carries $C_{k1}$, $C_{k2}$, $C_{k3}$ and $C_{k4}$ of the respective figures of the $k$-th group can be formularized, for example, as shown in (2) below:

$$C_{k1}=D_1+R_1\cdot C_{k11}$$
$$C_{k2}=D_2+D_1R_2+R_1\cdot R_2\cdot C_{k11} \qquad (2)$$
$$D_{k3}=D_3+D_2R_3+D_1\cdot R_2\cdot R_2\cdot R_3+R_1\cdot R_2\cdot R_3\cdot C_{k11}$$
$$C_{k4}=D_4+D_3R_4+D_2\cdot R_3R_4+D_1\cdot R_2\cdot R_3\cdot R_4+ \qquad (2)$$
$$R_1\cdot R_2\cdot R_3\cdot R_4\cdot C_{k11}$$

The individual carry circuits for obtaining $C_{k1}$—$C_{k4}$ on the basis of equations (2) above are such that, as shown in FIG. 3, $C_{k1}$ is obtained by passing the input signal $C_{k11}$ and $R_1$ through an AND circuit 301 and then passing the resulting signal output and $D_1$ through an OR circuit 302. In a similar way $C_{k2}$ is obtained by passing input signals $C_{k11}$, $R_1$ and $R_2$ through an AND circuit 303 and then passing the resulting signal, together with the output signal obtained by the passage of $R_2$ and $D_1$ through an AND circuit 304, and also with the input signal $D_2$, through an OR circuit 305. Likewise, $C_{k3}$ are obtained by passing input signals $C_{k11}$, $R_1$, $R_2$, $R_3$, $D_1$, $D_2$ and $D_3$ suitably through AND circuits 306 to 308 and OR circuit 309, as shown in FIG. 3, which $C_{k4}$ can be obtained by suitably passing input signals $C_{k11}$, $R_1$—$R_4$ and $D_1$—$D_4$ through AND circuits 310—313 and OR circuit 314. As will be obvious from equation (2) and FIG. 3, the carry $C_{k11}$ of the $k$-th group makes it possible to obtain the carry $C_k=C_{k4}$ immediately from the $k$-th group shown in FIG. 3 to the group on the following stage, i.e., $k$+1th group, by simply passing each signal through one stage each of the AND and OR circuits.

Thus, with a carry look ahead circuit as exemplified above wherein the carry circuits are divided into groups of four figures each, the carries are propagated all at once four figures ahead, thus remarkably increasing the operating speed. Once carries are obtained, the sum can be represented, as already described in connection with the equation (1), by the relations $$\underline{S_i=C_{i-1}\oplus A_i\oplus B_i}$$
$$=C_{i11}\cdot A_i\cdot B_i+C_{i11}\cdot \overline{A_i}\cdot \overline{B_i}+\overline{C}_{i11}\cdot A_i\cdot \overline{B_i}+\overline{C}_{i11}\cdot \overline{A_i}\cdot B_i \qquad (3)$$

and therefore, it can be obtained by virtue of the unit sum circuits as illustrated in FIG. 1$b$.

In formula (3) symbol ⊕ represents an exclusive logical sum. It signifies the logic, for example, that is "1" when only either A or B of $A\oplus B$ is "1", or "0" when both A and B are "1" or "0".

Figure 4:
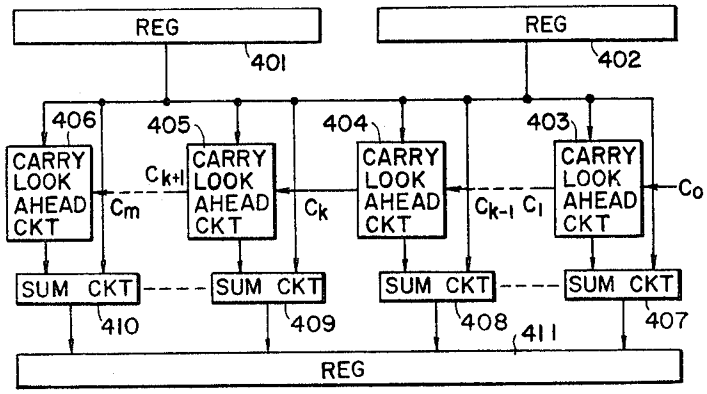
FIG. 4 PRIOR ART
FIG. 4 is a schematic diagram of an exemplary adder comprised of the carry look ahead circuits as shown in FIG. 3.

FIG. 4 is a schematic diagram showing an example of a conventional adder formed of carry look ahead circuits, as shown in FIG. 3. Numerals 401 and 402 indicate registers for setting an augend and addend which are connected, for example, to carry look ahead circuits 403—406 equipped with unit carry circuits as shown in FIG. 3 for the respective groups of several figures each. Also, the registers 401 and 402 are connected, together with the above-mentioned carry look ahead circuits, to sum circuits 407—410 comprised of the sum circuits, as shown in FIG. 1$b$, so that sums are generated from the carries produced by the carry circuits and the signals representing the augends and addends held by these registers. The sums are set in a register 411.

Since the carry look ahead circuit shown in FIG. 3 is composed of carry circuits divided into groups of four figures each, each carry is all at once propagated four figures ahead. If any additional carry circuits are provided for additionally propagating the carry forward, the carry will be transmitted even farther, thus permitting carry propagation at an even higher rate. As will be obvious from the exemplary circuit shown in FIG. 3, such a high-speed carry circuit is very complicated in construction and a high-speed adder incorporating the same in naturally expensive. Accordingly, the known method of error check which consists of providing two sets of the adder and detecting any disagreement between the results of operations as an error renders the error check very costly.

The error detecting system according to the present invention is advantageously used particularly with such a high-speed adder as mentioned above. The present invention will now be more fully described in conjunction with FIG. 5 of the accompanying drawings showing one embodiment thereof.

Figure 5:
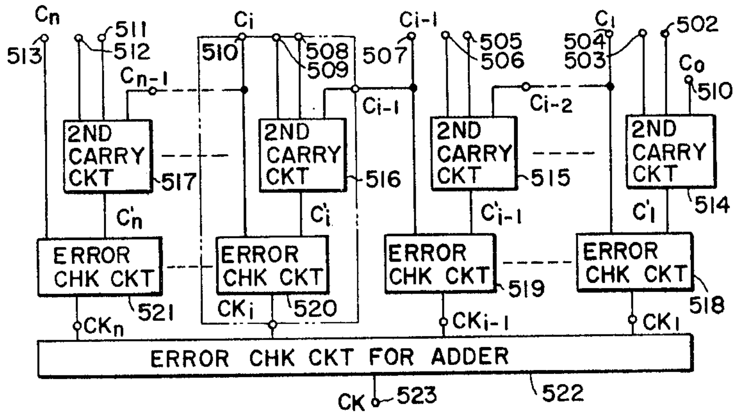
FIG. 5 is a schematic diagram of an embodiment of the present invention.

FIG. 5 is a schematic diagram showing an embodiment of the present invention, in which input terminals 504, 507, 510 and 513 are connected to the carry circuits of the adder as above described, in connection with FIG. 3, (which are hereinafter referred to as the 1st carry circuits) and carries $C_1 ... C_i$, $C_i ... C_n$ are applied thereto. On input terminal 501 is applied a carry $C_0$ to the least significant figure of the adder. On input terminals 502, 503, 505, 506...511, 512 are applied the same input signals as the input signals to the adder, i.e., augend $A_i$ and addend $B_i$, or the signals described in connection with FIG. 3, i.e., the signals $R_i=A_iB_i$ and $D_i=A_iB_i$.

Second carry circuits 514 through 517 produce second carries $C'_1 C'_{i-1}$, $C'_i ... C'_n$ on the basis of the logical formula (1), respectively, from the augend $A_i$ and addend $B_i$ or signals $R_i$ and $D_i$ applied to the above terminals and from the carry $C_{i11}$ produced by the next lower figure of the adder. The 2nd carries $C'_1 ... C'_{i11} ... C'_n$ are not propagated to the next higher figures but are solely used for the error check purpose. For this reason, the time for addition operation is not extended by the use of carry circuits having the simplest construction as shown in FIG. 1$a$ as the 2nd carry circuits.

Error check circuits 518 through 521 produce error check signals $CK_1$—$CK_n$ for each figure that indicate whether the 1st carries $C_1$, $C_2$,...$C_n$ from the 1st carry circuits and the 2nd carries $C'_1$—$C'_n$ generated by the 2nd carry circuits 514—517 are in agreement with each other. By observing the error check signals $CK_1$—$CK_n$ it is possible to detect which carry on what figure of the adder is wrong.

An error check circuit 522 is provided which generates an error check signal CK for the carry circuits as a whole on the output terminal 523 when at least one of the error check signals for an individual figure, i.e., $CK_1$, $CK_2$...$CK_n$, has indicated "1" meaning the occurrence of an error. This error check circuit 522 may be composed, for example, of an OR circuit of known construction.

Figure 6:
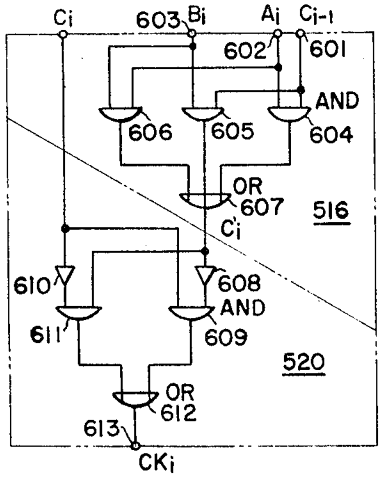

FIG. 6 is a schematic circuit diagram showing an essential part of the circuit arrangement of the embodiment shown in FIG. 5, in more detailed form. By way of illustration, there is shown only the portion of the $i$-th figure of the arrangement in FIG. 5 that is enclosed by chain lines, but it should be obvious that the same construction applies to the other figures.

An input terminal 601 is connected to a 1st carry circuit of the $i$—th figure that constitutes an adder and a carry $C_{i11}$ is applied thereto. On input terminals 602 and 603 are applied the signals which represent the augend $A_i$ and addend $B_i$, respectively, for the $i$-th figure. AND circuits 604 to 606, together with an OR circuit 607, constitute a 2nd carry circuit 516 of the embodiment shown in FIG. 5, where a second carry $C'_i$ is produced from the OR circuit 607 producing logical sums of output signals of AND circuits 604, 605 and 606 which produce logical products of different pairs of signals $C_{i-1}$ and $A_iC_{i-1}$ and $B_i$ and $A_i$ and $B_i$ respectively.

The second carry $C'_i$ and first carry $C_i$ generated by a 1st carry circuit for the $i$th figure of the adder are inverted, respectively, by inverters 608 and 610, and logical products of the uninverted $C_i$ and inverted $C'_i$, and vice versa are obtained by AND circuits 609 and 611. Further by an OR circuit 612 a logical sum of the output signals of said AND circuits 609 and 611 is obtained. Thus, an error check signal $CK_i$ for the $i$th figure is provided at the output terminal 613. The AND circuits 609 and 611, together with the OR circuit 612 constitute the error check circuit 520 shown in FIG. 5, so that when the first and second carries $C_i$ and $C'_i$ fail to agree with each other the error check signal $CK_i$ will become "1".

The logic circuit illustrated in FIG. 6 can be represented by logical formulas (5):

$$C'_i=C_{i-1}\cdot A_i+C_{i-1}\cdot B_i+A_i\cdot B_i$$
$$CK_i=C_i\overline{C'_i}\,\overline{C_i}C'_i=C_i\oplus C'_i \qquad (5)$$

The formulas (5) can be put together and rewritten as the formula (6):

$$CK_i=C_i\oplus(C_{i-1}\cdot A_iC_{i-1}\cdot B_i+A_i\cdot B_i \qquad (6)$$

Here the probability of error detection on the occurrence of errors on the carry circuits of the adder will be considered on the assumption that the circuits shown in FIGS. 5 and 6 are free from any erroneous operation.

In Table 1 there are given various combinations of signals of the circuits shown in FIG. 6 and the conditions of error check signals when the carry $C_{i-1}$ and/or $C_i$ is erroneous.

TABLE 1

| $A_i$ | $B_i$ | $C_{i-1}$ | $C'_1$ | $C_1$ | ($C_{i-1}$O, $C_i$X) $CK_1$ | ($C_{i-1}$X, $C_i$O) $CK_i$ | ($C_{i-1}$X, $C_i$X) $CK_i$ |
|---|---|---|---|---|---|---|---|
| 0 | 0 | 0 | 0 | 0 | 1 | 0 | 1 |
| 0 | 0 | 1 | 0 | 0 | 1 | 0 | 1 |
| 0 | 1 | 0 | 0 | 0 | 1 | 1 | 0 |
| 0 | 1 | 1 | 1 | 1 | 1 | 1 | 0 |
| 1 | 0 | 0 | 0 | 0 | 1 | 1 | 0 |
| 1 | 0 | 1 | 1 | 1 | 1 | 1 | 0 |
| 1 | 1 | 0 | 1 | 1 | 1 | 0 | 1 |
| 1 | 1 | 1 | 1 | 1 | 1 | 0 | 1 |

In the table, ($C_{i-1}$O, $C_i$X) represents the condition of the error check signal in the case where $C_{i-1}$ is correct but $C_i$ is erroneous, ($C_{i-1}$X, $C_i$O) indicates the signal condition where $C_i$ is correct but $C_{i-1}$ is erroneous and ($C_{i-1}$X, $C_i$X) indicates the signal condition where both $C_{i-1}$ and $C_i$ are incorrect.

It is manifest from Table 1 that whenever $C_{i-1}$ is correct and $C_i$ is erroneous the condition $CK_i=1$ is established, thus permitting the error detection in a foolproof manner. When $C_{i-1}$ is incorrect, the chance of $CK_i$ becoming "1" is fifty-fifty regardless of whether the $C_i$ is correct or not. Hence the probability of error detection is 50 percent.

The error check signal CK for the whole of carry circuits of the adder is given by the error check circuit 522 of the embodiment shown in FIG. 5, in terms of the logic formula (7):

$$CK=CK_1CK_2+\ldots+CK_n \qquad (7)$$

It then follows that the combinations of 1st carries which do not permit the error check because the CK in the formula (7) is not made to be "1" when there has occurred an error in any carry circuit, are as shown in Table 2.

The symbol "0" in Table 2 indicates that the carry is correct as opposed to the symbol "X" which indicates an erroneous carry. If it is assumed that errors of 1st carries take place in respective figures independently of one another,

TABLE 2

| $C_n$ | $C_{n-1}$ | ........ | $C_3$ | $C_2$ | $C_1$ | $C_0$ |
|---|---|---|---|---|---|---|
| 0 | 0 | ........ | 0 | 0 | 0 | X |
| 0 | 0 | ........ | 0 | 0 | X | X |
| 0 | 0 | ........ | 0 | X | X | X |
| ........ | ........ | ........ | ........ | ........ | ........ | ........ |
| ........ | 0 | ........ | X | ........ | ........ | ........ |
| 0 | X | ........ | X | X | X | X |
| X | X | ........ | X | X | X | X |

then the respective figures are either correct or not. Thus, the permutations of the cases in which any of the 1st carries becomes erroneous will be $2^{n+1}-1$ in all. Also, because the probabilities of the impossibility of error detection in the cases shown in Table 2 are $$\frac{1}{2},\frac{1}{2^2}\cdot\cdot\cdot\frac{1}{2^n+1}$$

in the decreasing order, the probability P of the failure of error detection on the occurrence of errors can be represented by the following equation (8):

$$P=\frac{1}{2^{n+1}-1}\left(\frac{1}{2}+\frac{1}{2^2}+\cdot\cdot\cdot+\frac{1}{2^{n+1}}\right)=\frac{1}{2^{n+1}} \qquad (8)$$

Accordingly, if $n=64$, then $P=(1/2)^{65}=2.7\times10^{120}$ and almost all errors that may occur can be detected. In practice, the probability of failure of error detection will somewhat vary from the above value because the errors may take place on particular figures in association with the preceding and following figures.

Also, as will be clear from Table 2, the error check system according to the present invention enables the detection of any error of carry provided that the carry $C_0$ for the least significant figure of adder is not incorrect. The carry $C_0$ is not a carry produced inside the adder but is a signal applied to the adder from an external circuit, and therefore an error of $C_0$ cannot be deemed, in a strict sense of the word, as an error of any adder component.

It must be noted, however, that when subtraction or other operation is carried out with an adder, the 2's complement must be found for the subtrahend and, at that time, it is necessary to invert the binary digit of each figure of the subtrahend and add it to the minuend and also supply a carry $C_0$ so that 1 can be added to the least significant figure of the adder. Thus, because the carry $C_0$ emerges very often, for example, in subtraction, addition of positive and negative numbers, operation of A+B+1, it is possible to detect almost perfectly the errors of the adder including its external circuit by providing two sets of circuits which may be called a type of decoder generating $C_0$'s and detecting a disagreement between the two, if any, as an error.

The logic formula (5) which represents the 2nd carry $C'_i$ may take various modifications. For example, the 2nd carry $C'_i$ when represented by equations (9) and (10) below is still logically equivalent to the $C'_i$ of the formula (5).

$$C'_i=C_{i-1}\cdot(A_i+B_i)+A_i\cdot B_i \qquad (9)$$
$$C'_i=C_{i-1}\cdot(A_i\oplus B_i)+A_i\cdot B_i \qquad (10)$$

Especially with the adders as shown in FIGS. 3 and 4, in which there are already provided on the input side the circuits for obtaining signals $R_i=A_iB_i$ or $R_i=A_i\oplus B_i$ and $D_i=A_i\cdot B_i$, the equation (9) above is rewritten as (11) when these signals are to be used.

$$C'_i=C_{i-1}\cdot R_i+D_i \qquad (11)$$

Thus, from the formulas (5) and (11) a logic formula such as formula (12) may be obtained which represents an error check signal $CK_i$.

$$CK_i=C_i\oplus(C_{i-1}\cdot R_iD_i) \qquad (12)$$

Figure 7:
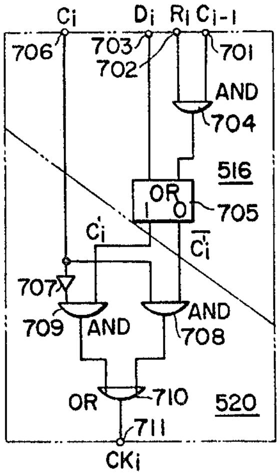
FIGS. 6, 7 and 9 are schematic circuit diagrams showing the essential parts of other different embodiments of the present invention.

FIG. 7 is a schematic circuit diagram showing the essential part of a structure using a carry $C_{i-1}$ and signals $R_i$ and $D_i$ as another embodiment of the present invention which is constructed on the logic formula (12).

An input terminal 701 is connected to a 1st carry circuit for the $i-1$th figure of an adder, and a 1st carry $C_{i-1}$ is applied thereto. On another input terminal is applied a signal $R_i$, and a logical product with the said carry $C_{i-1}$ is obtained through an AND circuit 704. On an input terminal 703 is applied a signal $D_i$ which, together with the output signal of the AND circuit 704, enters an OR.NOR circuit 705 to give a logical sum. The OR.NOR circuit 705 consists of a CML (current mode logic) circuit of well-known type, for example, as shown in FIG. 8.

Figure 8:
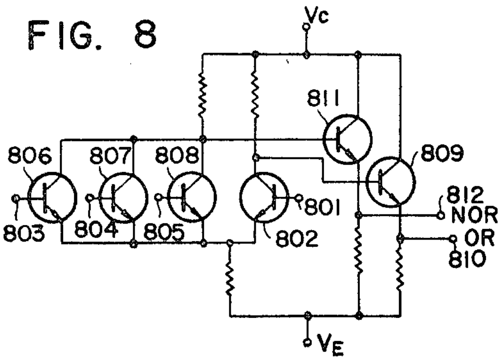
FIG. 8 is a circuit diagram showing an example of a known or circuit.

The CML circuit shown in FIG. 8 comprises a plurality of parallelly connected transistors 806 to 808 and a transistor 802 connected thereto with emitter common configuration, which altogether constitute a current switch circuit. Each of the collector outputs is subjected to current amplification by an emitter follower circuit formed of the transistors 809 and 811.

If at least one of the input signals being applied to the input terminals 803 to 805 shows a voltage at a higher level than the reference voltage applied to the terminal 801, the current will then flow through the transistor supplied with the high level input signal or signals, with the result that the collector potential of the particular transistor will drop and the output signal of output terminal 812 will drop to a low level. On the other hand, no current will pass through the transistor 802, resulting in a rise of the collector potential of the transistor 802. The output signal of the output terminal 810 will consequently reach a high level. In this way, an OR signal is obtained at the output terminal 810 for the input signals applied to the input terminals 803, 804 and 805 and, at the same time, their NOR signal is obtained at the output terminal 812. Thus, on the one's output terminal of the NOR circuit 705, $C'_i$ is obtained as the OR signal, and on the zero's output terminal, $\overline{C'_i}$ is obtained as the NOR signal.

This means that, in FIG. 7, the 2nd carry circuit 516 of the embodiment shown in FIG. 5 is composed of this OR.NOR circuit 705 and the AND circuit 704. Also, the error check circuit 520 of the embodiment shown in FIG. 5 is comprised of the AND circuits 708 and 709 and the OR circuit 710.

By the AND circuits 708 and 709 the 2nd carry $C'_i$ and its inverted signal $\overline{C'_i}$ are used to obtain logical products with the 1st carry $C_i$ applied from the 1st carry circuit at the input terminal 706 and with the signal $\overline{C_i}$ that is obtained by inverting $C_i$ through the inverter 707. Further, in the OR circuit 710, a logical sum of the output signals from the AND circuits 708 and 709 is obtained. After all, at the output terminal 711, an error check signal $CK_i$ for the *i*-th figure can be obtained. While the foregoing description has been made with respect to a typical circuit component as enclosed by dashed lines in FIG. 5, the same applies to the rest of the circuit construction illustrated in FIG. 5.

In the embodiment shown in FIG. 7, the 1st carry $C_{i1}$ and signals $R_i$ and $D_i$ are used as input signals as above described, and therefore the 2nd carry circuit is simplified in construction. Such circuit arrangement, however, is incapable of detecting any error which may occur in the OR circuit or AND circuit which generates the signal $R_i=A_i^{B_i}$ or $D_i=A_i^{B_i}$. In order to detect any error of the signal $R_i$ or $D_i$, a circuit as exemplified in FIG. 6 must be employed. As an alternative, it is possible to carry out an error check of the carry circuit including the signals $R_i$ and $D_i$ through the addition of an OR circuit ($R_i=A_{ia8}+B_i$) and AND circuit (D
signals are the augend $A_i$ and addend $B_i$, to the input terminals 702 and 703 of the embodiment shown in FIG. 7.

Some embodiments of the present invention have so far been described in connection with the error check of carry circuits of the adder. Explanation will now be made of the error check of the adder as a whole, including the sum circuit. While the error check of carry circuits of the adder is performed with the embodiments shown in FIGS. 5 through 7, the error of the sum circuit can be detected by the prior art technique of parity check. However, the parity check is of no use in the case where an even number of errors have occurred in any signal, as already pointed out.

As stated earlier, the sum signal on the *i*-th figure can be obtained from the augend $A_i$, addend $Bi$, and from the carry $C_{i1}$ on the *i*-th figure, by the equation (13):

$$S_i = A_i \oplus B_i \oplus C_{i1} \quad (13)$$

Thus, from the 2nd carry $C'_{i1}$ in the embodiments of FIGS. 5 through 7, a 2nd nd sum signal $S'_i$ is obtained aside from the sum signal of the adder. $S'_i$ is represented by the equation (14):

$$S'_i = A_i \oplus B_i \oplus C'_{i1} \quad (14)$$

Here if the error check signal $CK_i$ is obtainable from the equation (15), that is, $$CK_i = S_i \oplus S' \quad (15)$$

the error check of the adder including the sum circuit is then made possible. The equation (15) merely obtains $S'_i$ as an exclusive logical sum of $C'_{i1}$ and $A_i$ and $B_i$ instead of obtaining $CK_{i1}$ from the exclusive OR of $C_{i1}$ and $C'_{i1}$ in the equation (5), and obtains $S_i$ as an exclusive logical sum of $C_{i1}$ and $A_i$ and $B_i$, and then obtains the exclusive logical sum of $S_i$ and $S'_i$. In this sense the circuit for obtaining $S_i$ from $C_{i1}$, $A_i$ and $B_i$ is nothing else than a sum circuit of the adder. Thus, the error check of the adder inclusive of the sum circuit is rendered possible by slightly modifying the error check system for carry circuits according to the invention which has already been described.

Figure 9:
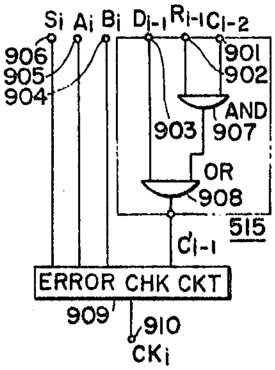

Substituting $S'_i$ in the equation (15) with $S'_i$ in the equation (14), we obtain $$CK_i = S_i \oplus A_i \oplus B_i \oplus C'_{i1} \quad (16)$$

which means that when an odd number of input signals $S_i$, $A_i$, $B_i$ and $C'_{i1}$ is "1," $CK_i$ will be "1," too. Therefore, as an embodiment that satisfies the equation (16), a circuit as schematically shown in FIG. 9 may be constituted. Although the circuit shown in FIG. 9 is only of the *i*-th figure, it is of course possible to provide the same circuit for the other figures as well.

Referring to FIG. 9, a 2nd carry circuit of the embodiment shown in FIG. 5, for example the circuit 515 in the same diagram is comprised of an AND circuit 907 and an OR circuit 908. This 2nd carry circuit derives the logical product of $C_{i2}$ and $R_{i1}$ through the AND circuit 907 from the signals $C_{i2}$, $R_{i1}$ and $D_{i1}$ that are applied, respectively, on the input terminals 901 to 903 and derives the logical sum of the $D_i$ and the output signal of the AND circuit 907 through the OR circuit 908 thereby to obtain the 2nd carry $C'_{i1}$. Instead of the 2nd carry circuit comprised of the AND circuit 907 and OR circuit 908, it is of course possible to use a 2nd carry circuit for the $i-1$th figure which consists of the AND circuits 604 to 606 and OR circuit 607 as shown in FIG. 6 and which is capable of generating a 2nd carry $C'_{i1}$ from input signals $C_{i2}$, $A_{i1}$ and $B_{i1}$.

An error check circuit is generally indicated at 909. In this circuit, if an odd signal or signals among the 2nd carry which is the output signal of the OR circuit 908, the addend $B_i$, the augend $A_i$ and the sum $S_i$ of the *i*-th figure have turned out to be "1,"the error check signal $CK_i$ emerges as "1" at the output terminal 910.

Figure 10:
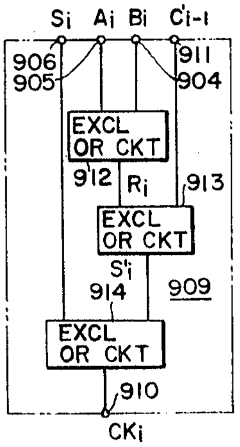
FIGS. 10 to 12 are diagrams showing different exemplary circuits of the embodiment of the invention illustrated in FIG. 9.
Figure 11:
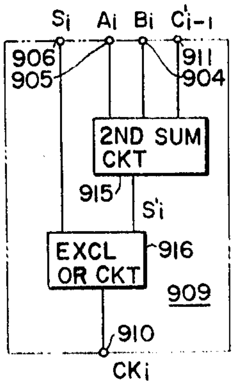
Figure 12:
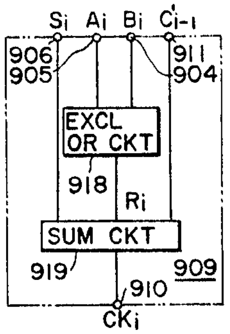

The error check circuit 909 is intended for the logical operation of the equation (16), and is available in the detailed forms, for example, as shown in FIGS. 10, 11 and 12.

FIG. 10 is a schematic circuit diagram of a form of the error check circuit 909. Reference numerals 912, 913 and 914 designate exclusive OR circuits (which are hereinafter referred to simply as EXCL OR). On the input terminals 904 and 905 of EXCL OR 912 are applied, respectively, the addend $B_i$ and Augend $A_i$, whereby an output signal $R_i=A_i \oplus B_i$ is produced. EXCL OR 912 may consist of an exclusive OR circuit of any well-known type. For example, it may be constituted by the same circuit as the error check circuit 520 consisting of AND circuits 609, 611 and OR circuit 612 as shown in FIG. 6. EXCL OR 913 receives as input signals the 2nd carry $C'_{i1}$ applied on the input terminal 911 and the signal $R_i$ derived from EXCL OR 912, and produces a 2nd sum $S'_i$ as the output signal. Thus, the sum $S'_i$ and the sum $S_i$ produced by the adder through the terminal 906 are applied on EXCL OR 914, with the result that an error check signal $CK_i$ is generated at the output terminal 910. The EXCL ORs 913 and 914 may again consist of the same circuit as the error check circuit 520.

FIG. 11 is a schematic circuit diagram of another form of the error check circuit 909. Numeral 915 indicates a 2nd sum circuit and 916, an exclusive OR circuit. The 2nd sum circuit replaces the EXCL ORs 912 and 913 shown in FIG. 10 and has the same circuit construction as sum circuit illustrated in FIG. 1*b*. It produces a 2nd sum $S'_i$ from the signals $A_i$, $B_i$ and $C'_{i1}$ that are applied on terminals 905, 904 and 911, respectively. EXCL OR 916 may be the same as the EXCL OR 914 shown in FIG. 10.

FIG. 12 is a schematic circuit diagram of still another form of the error check circuit 909. Numeral 918 indicates an exclusive OR circuit and 919, a circuit of the same construction as the sum circuit shown in FIG. 1*b*.

The exemplary circuits shown in FIGS. 10, 11 and 12 are all logical modifications of the equation (16), corresponding, respectively, to the equations (17), (18) and (19) as follows:

$$CK_i = S_i \ominus [(A_i \oplus B_i) \ominus C'_{i-1}] \quad (17)$$

$$CK_i = S_i \bar{\oplus} (A_i \bar{\oplus} B_i \ominus C'_{i-1}) \quad (18)$$

$$CK_i = S_i \oplus (A_i \oplus B_i) \oplus C'_{i-1} \quad (19)$$

Since further modifications from the equation (16) are possible, still other circuit constructions can be of course obtained accordingly from the respective equations.

Thus, the error check signal CK for the adder as a whole can be obtained from the error check signal $CK_i$ by dint of the error check circuit as embodied in FIG. 5 which satisfies the equation (7).

As has been described above, the error detecting system of the adder according to the present invention at a glance resembles the conventional technique of detecting an error through the use of a pair of adders, in that the system of the invention also relies upon the disagreement between the 1st carry $C_i$ and the 2nd carry $C'_i$ or between the 1st sum $S_i$ and the 2nd sum $S'_i$ for the detection of an error. According to the conventional method of using two adders, however, the time required for the detection of an error is governed by the adder of the lower operating speed because there is no organic connection therebetween, and, when a high-speed adder is combined with a low-speed one, the error detection becomes possible only after the low-speed adder has given its operation result. For this reason, it is necessary for the error detection of a high-speed adder as illustrated in FIGS. 3 and 4 to provide a pair of high-speed adders of substantially the same speed.

On the other hand, the error detection system for the simplified according to the present invention is so constructed that the 1st carry circuit on the $i$—1th figure of the adder is organically coupled to a 2nd carry circuit on the $i$-th figure provided separately from the adder and that immediately after generation of the 1st carry $C_{i-1}$ on the $i$—1-th figure of the adder the 2nd carry $C'_i$ can be produced on the $i$-th figure. Accordingly, if a high-speed carry circuit shown in FIG. 3 is used as the 1st carry circuit, the 2nd carry circuit can nevertheless be comprised of a simplified circuit as shown in FIGS. 6 or 7. Moreover, any error in operation can be detected almost simultaneously with the completion of operation by the high-speed adder.

We have shown and described several embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as obvious to one of ordinary skill in the art.

We claim:

1. In a high-speed adder having a plurality of sum circuits and a plurality of first carry circuits formed by carry look ahead circuits, said first carry circuits and said sum circuits generating a first carry and a sum for each figure of said adder, respectively, as a result of addition between an augend and an addend, an error detecting system for the adder comprising:

second carry generating means including a plurality of second carry circuits each of which is supplied with said augend and addend for each figure and a carry for the next lower figure derived from the next lower order first carry circuit for operatingly generating a second carry for each figure; and error check means for comparing said first carry for each figure derived from said first carry circuits to the corresponding second carry for each figure derived from said second carry circuits and generating an error check signal when said first carry and said second carry do not agree with each other.

2. An error detecting system for an adder according to claim 1 wherein:

the error check means comprises a plurality of comparison means connected to said first carry circuits and the corresponding second carry circuits, respectively, for comparing said first carry to the corresponding second carry to generate an error signal when said carries do not agree with each other; and detecting means connected to all of said comparison means for detecting occurrence of said error signals to generate said error check signal for said entire adder.

3. An error detecting system for an adder according to claim 2 wherein said comparison means is comprised of an exclusive OR circuit.

4. An error detecting system for an adder according to claim 2 wherein said detecting means is comprised by a logical sum circuit for said error signals.

5. An error detecting system for a high-speed adder having a plurality of first carry circuits formed by carry look ahead circuits, and a plurality of sum circuits, said first carry circuits and said sum circuits generating a first carry and a sum for each figure of said adder, respectively, as a result of addition between the augend and the addend, which comprises:

second carry generating means including a plurality of second carry circuits each of which is supplied with said augend and addend for first carry circuit for generating a second carry for each figure, respectively; and error check means for detecting an error of said sum circuits of said adder including means for generating an error check signal representing an exclusive logical sum of said augend and addend applied to said adder, said sum being derived from said sum circuit of said adder and said second carry being derived from the next lower second carry circuit.

6. An error detecting system for an adder according to claim 5 wherein said error check means is comprised by a second sum circuit for producing a second sum from said augend and addend applied to said adder and said second carry derived from the next lower second carry circuit and means for comparing said sum derived from said sum circuit of said adder to the corresponding second sum derived from said second sum circuit to generate said error check signal when said sums do not agree with each other.

7. An error detecting system for an adder according to claim 5 wherein said error check means is comprised by an exclusive OR circuit for producing an output signal representing exclusive OR of said augend and addend of said adder means and means for producing said error check signal from said output signal of said exclusive OR circuit, said sum being derived from said sum circuit of said adder and said second carry being derived from the next lower second carry circuit.